Aug. 29, 1933.　　　P. GAISER　　　1,924,781
LOW PRESSURE DIAPHRAGM GAUGE
Filed April 13, 1929
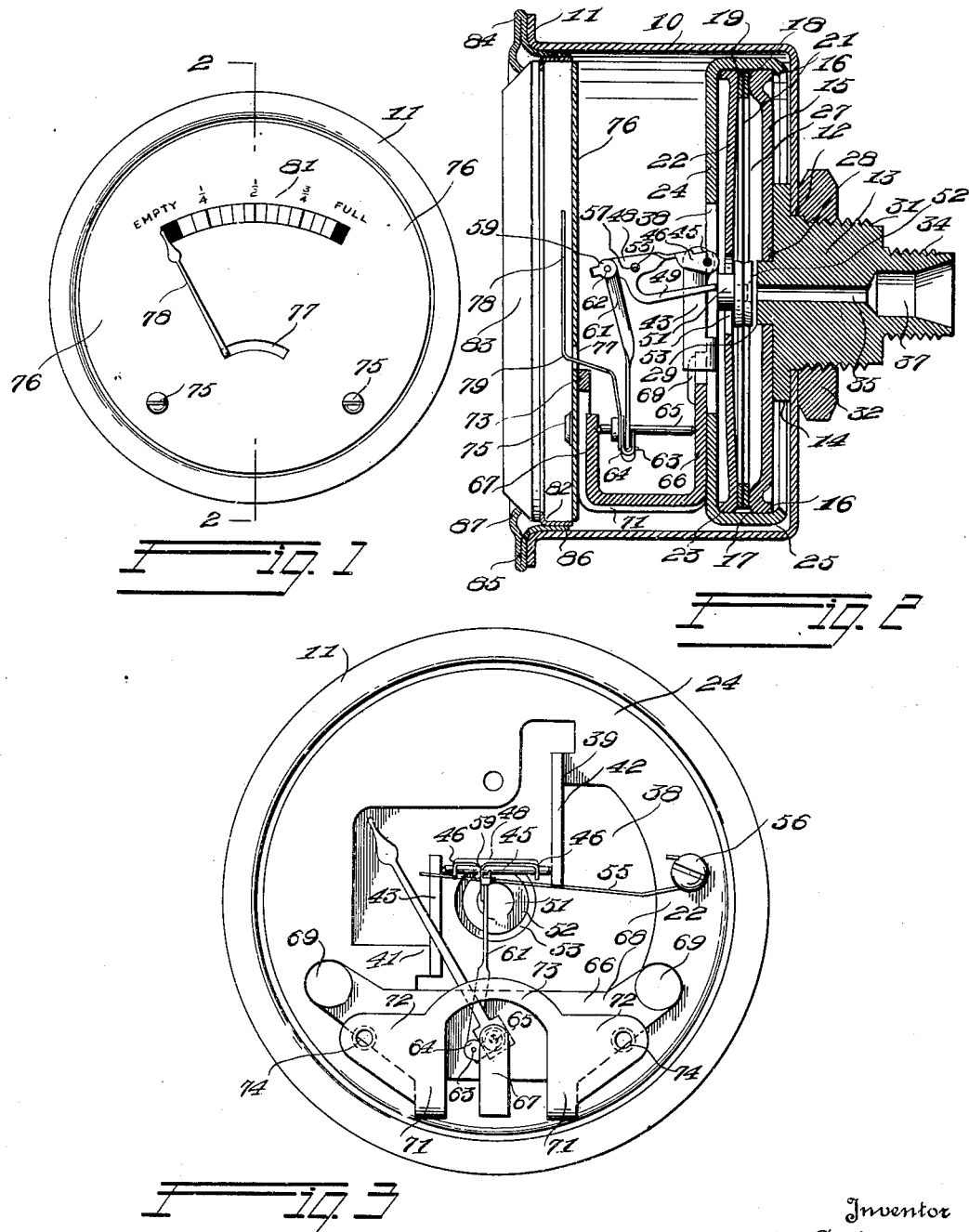
Inventor
Paul Gaiser
By
Strauch & Hoffman
Attorneys Patented Aug. 29, 1933

1,924,781

UNITED STATES PATENT OFFICE 1,924,781

LOW PRESSURE DIAPHRAGM GAUGE

Paul Gaiser, Sellersville, Pa., assignor to The United States Gauge Company, New York, N. Y., a corporation of Pennsylvania Application April 13, 1929. Serial No. 354,823

7 Claims. (Cl. 73—110)

The present invention relates to a low pressure diaphragm gauge.

More specifically, the invention relates to a low pressure gauge designed especially for indicating at a distance the variations in the depth of a liquid, the total variations in depth of which may be relatively small, thus requiring a sensitive gauge in order to accurately record the fluctuations.

Gauges constructed in accordance with the present invention, are specially adapted for use in connection with automobiles for indicating the depth of gasoline in the tank, the depth of water in the radiator, the depth of oil in the crankcase, or the depth of electrolyte in the storage battery, for example. It will be understood, however, that the gauge may be used in any situation in which small changes in pressure of a fluid are to be visually indicated with unusual accuracy.

Diaphragm gauges of various constructions have heretofore been constructed, in which a flexible metallic diaphragm, upon vibratory movement thereof, imparted movement to a pointer or similar indicating means movable along a scale on the gauge dial. While gauges of this general character heretofore proposed operate satisfactorily for indicating substantial changes in pressure, it has been found that in order to indicate very small changes in pressure, such as caused by relatively small variations in depth, such as the depth of water in an automobile engine cooling system, it is necessary to provide a very sensitive diaphragm and associated parts in order that the gauge will respond to the slight pressure changes caused in this way. This invention aims to provide a gauge including a pressure chamber, one wall of which is formed by a diaphragm of great flexibility, and to so mount the extremely flexible diaphragm that it will not be injured by excessive pressures inadvertently applied to it, and so that its movement will truly and accurately indicate slight changes in pressure.

It is a further object of the present invention to provide a low pressure diaphragm gauge having a diaphragm of such light weight that its movement presents a very small resistance in order to accurately indicate relatively slight changes in liquid level.

It is a still further object of the present invention to provide a low pressure diaphragm gauge embodying a highly flexible and sensitive pressure change indicating diaphragm provided with means to limit the diaphragm movement and prevent its rupture.

It is a still further object of the invention to provide a low pressure diaphragm gauge embodying a light, highly flexible non-metallic diaphragm, and means for limiting movement of said diaphragm for avoiding injury thereto, assembled so that the gauge can be constructed at a low cost.

It is a still further object of this invention to provide a low pressure diaphragm gauge adapted for accurate measurement of slight changes in liquid level, which is simple in construction and adapted to be expeditiously manufactured and assembled.

With these objects in view, as well as others that will become apparent from the following disclosure, reference will be had to the accompanying drawing forming part of same and in which:

Figure 1 is a front elevational view of the gauge with the crystal and securing means therefore removed.

Figure 2 is a transverse sectional view as seen on line 2—2 of Figure 1 of the complete gauge, the section being shown on an enlarged scale.

Figure 3 is a front elevational view on an enlarged scale of the gauge with the crystal and dial removed for more clearly indicating the operating mechanism.

Referring to the drawing by reference characters in which like characters designate like parts, 10 designates the gauge casing which is preferably of cylindrical formation, and is provided with an outturned flange 11 at the front open end thereof. An opening 12 is provided in the rear closed wall thereof for the detachable reception of connection 13, the opposite side walls of opening 12 and connection 13 being, preferably, flattened in any manner to prevent rotation of connection 13 within opening 12. Connection 13 is provided with a flange 14 suitably secured, as by soldering, to the back of a diaphragm plate 15, provided with a marginal outturned flange 16 and defining an oppositely directed marginal flattened bead portion 17. Engaging the portion 17 there is a packing ring 18 between which and an opposing packing ring 19 there is positioned the margin of a light weight diaphragm 21 of great flexibility. Packing ring 19 engages the margin of a slightly outwardly dished diaphragm stop plate 22, which stop plate is provided with a marginal flange 23 engaging the base of a diaphragm securing and mechanism supporting plate 24. Plate 24 is provided with a cylindrical flange 25 which, with the base thereof, defines a receptacle for diaphragm plate 15, diaphragm stop plate 22, packing rings 18 and 19 and the interposed diaphragm 21. After these elements are disposed in member 24 the outer end of flange 25 is bent over into engagement with flange 16, as indicated in Figure 2, pressing plates 15 and 22 toward each other and tightly compressing packing rings 18 and 19 therebetween and into engagement with diaphragm 21 whereby the margin of the diaphragm is firmly and immovably held in position.

The dished stop plate 22 serves to limit the movement of the diaphragm 21 and to prevent its rupture, if subjected to abnormal pressures, because said plate conforms to the form that the diaphragm will naturally assume when subjected to such pressures. This is a feature of importance in gauges having light diaphragms of the character needed for use in showing fluctuations in very low pressures. The bead portions 17 of plate 15 present convex surfaces to the rings 18 and 19 which, when the edges of flange 25 are bent to clamp the elements contained in member 24 together, tend to bite into said rings causing a fluid-tight joint around the diaphragm edges. This joint may be formed expeditiously before member 24 is inserted in casing 10.

Diaphragm plate 15 and diaphragm 21 define a pressure chamber 27 into which projects, through a central aperture 28 in plate 15, a cylindrical or similar extension 29 of the connection 13. Connection 13 comprises an externally threaded portion 31 for threaded engagement with a nut 32 for bringing flange 14 into engagement with the back wall of casing 10 and clamping said wall between said flange and said nut. Connection 13 further comprises a reduced externally threaded portion 34 for detachable connection with a conduit in communication with a varying pressure source. Portion 31 of connection 13 is provided with a relatively small bore 35 opening through extension 29 into communication with pressure chamber 27 at one end thereof and at the opposite end thereof communicating with a substantially enlarged bore 37 in the portion 34.

Plate 24 is provided in the base thereof with an opening 38, indicated more clearly in Figure 3. Extending within opening 38 are a pair of extensions 39 and 41 to which the opposite ends of brackets 42 and 43 respectively are integrally, or otherwise, secured. As shown, the adjacent ends of said brackets are transversely spaced and in lapping relation as indicated in Figure 3. Rotatably journaled in the adjacent ends of brackets 42 and 43 are the opposite ends of a pintle 45 to which are secured the transversely spaced ears 46 of an adjustable light sheet metal rocker arm 48 comprising a finger 49 the free end of which engages a plug 51 secured to the center of diaphragm 21 by riveting through opposing washers 52. Plug 51 projects through a central aperture 53 in plate 22, as clearly indicated in Figure 2. The end of finger 49 is maintained in engagement with plug 51 by means of a relatively light wire spring 55 one end of which is detachably secured to member 24 by a screw 56 and the opposite end of which extends through an aperture 57 in rocker arm 48. Said spring functions to return the indicator hand of the gauge, presently to be referred to, toward its zero position, when the pressure affecting the diaphragm drops, if a diaphragm is used that is not inherently resilient.

The outer end of rocker arm 48 is bent providing a bearing 59, in which is positioned the outer end of a connecting link 61, which link is pivotally secured in said bearing by a pivot pin 62. The inner end of link 61 is pivotally secured by means of a pin 63 to one end of a crank arm 64 the opposite end of which is fixed to a pintle 65 the opposite ends of which are rotatably journaled in the base 66 and the outer end of a central, preferably integral, tongue member 67 of a bracket 68 respectively, the opposite ends of said bracket are riveted to member 24 as indicated at 69 in Figure 3.

Preferably, with base 66 of bracket 68 are other arms 71 in spaced relation to arm 67 and terminating in laterally directed ears 72 connected by an arched portion 73. As will be seen in Figure 2 ears 72 are in parallel spaced relation to base 66 and are tapped as indicated at 74 for the reception of screws 75 which extend through and detachably secure a dial 76 to bracket 68 in parallel spaced relation to plate 24. Dial 76 is provided with an arcuate slot 77 having pintle 65 as a center. Projecting through slot 77 is an indicating hand 78, which, intermediate its ends, is bent as indicated at 79 for passage and movement through slot 77. The inner end of hand 78 is fixed to pintle 65 adjacent the corresponding end of crank arm 64.

The dial 76 is provided with a suitable indicating scale 81 which may be varied according to the use to which the gauge is to be put.

Detachably mounted in the open end of casing 10 is a unitary crystal assembly comprising a marginally flanged glass supporting ring 82 on which is supported the margin of a glass 83, which is maintained in engagement with ring 82 by a ring 84 which is bent upon itself, as indicated at 85, defining a cylindrical flange 86 suitably secured to ring 82 and adapted for frictional engagement with the inner surface of the outer end of casing 10 and further defining a beaded flange 87 engaging glass 83 for holding same into engagement with ring 82, the bent over portion 85 engaging the outturned flange 11 of casing 10 as indicated in Figure 2.

The diaphragm 21 is constructed of a very flexible material in order that it will be sensitive to very slight changes in pressure to which it is subjected within the pressure chamber 27. It is preferably constructed of nonmetallic material. Nonmetallic materials, such as gold beater's skin, silk treated with latex, very fine mesh silk treated with varnish or a similar substance to make it fluid tight, and sheet rubber, provided suitable diaphragm materials, as diaphragms constructed from these materials are very flexible and impose little resistance to their movement as a result of which they are extremely sensitive to pressure changes. Very light diaphragms of metallic materials, such as Monel metal and German silver, may be used to provide diaphragms suitable for low pressure gauges. Metallic diaphragms, particularly the Monel metal diaphragms, will withstand attack of various gases or vapors given off by different liquids with which the gauge may be associated. It is highly important regardless of the material employed that the diaphragm be very flexible so as to present little inherent resistance to flexing thereof in order to adapt the gauge to the measurement of very low pressures. At the same time the material used must be impervious to air or other fluids.

In operation of the gauge, casing 10 having all the operating parts supported therein is suitably secured in visible position, as in the dash of an automobile or in any other position depending upon the use to which the gauge is to be put. A conduit leading from any chamber or vessel is detachably connected to the threaded portion 34 of connection 13. The column of air or fluid in said conduit is caused to exert a variable pressure on diaphragm 21 depending on conditions in said chamber or vessel. If desired, the connection may be made to a vessel having a liquid the level of which varies, as for example, the gasoline tank, the engine water cooling system, or oil reservoir of an automobile. Upon change of level of the liquid in the chamber or vessel the pressure on the diaphragm will fluctuate as the liquid rises or falls in the vessel, causing actuation of the flexible diaphragm 21. Such actuation will impart lateral movement thereto and if the pressure is increased the diaphragm 21 will move inwardly or to the left as seen in Figure 2 moving plug 51 therewith which through finger 49 will impart movement to rocker arm 48, which in turn, through link 61 and crank arm 64, will impart rotation to pintle 65 and consequently to the indicating hand 78 which is secured to pintle 65. Upon reduction of pressure within chamber 27, occasioned by a variation of the liquid level, diaphragm 21 will move outwardly or to the right as seen in Figure 2 and as spring 55 maintains finger 49 in engagement with plug 51 rocker arm 48, link 61 and hand 78 will move in the opposite direction commensurate with the movement of said diaphragm. When a gauge such as described is used as a liquid level indicator, it will be understood that very low pressures are involved. By using a non-metallic diaphragm of the kind above described the gauge will respond to variations in pressure as low as 1½ inches of water with accuracy.

The rocker arm 48 is constructed of thin sheet material in view of which finger 49 can be bent at the curved connection thereof with arm 48 for readily providing an adjustment relative to diaphragm 21 and indicating hand 78.

It will be seen from the foregoing disclosure that connection 13, plates 15 and 22, diaphragm 21 and plate 24, as well as the indicating mechanism carried by plate 24, including dial 76, are assembled as a unit and are bodily insertable within casing 10 with connection 13 projecting through opening 12 after which nut 32 is tightened for securely binding the assembled unit within the casing. After assembly of the unitary construction above referred to within casing 10, the crystal assembly is applied to the outer open end of casing 10 by forcing flanges 86 within the outer end of the casing.

It will further be seen that diaphragm 21 is securely maintained between plates 15 and 22 and that plate 22 further functions as a stop for the flexible diaphragm 21 which, due to its lightness and thinness, would be subject to injury if permitted too great a range of flexing action. All of the parts are light in weight and simple in form.

While I have disclosed but a single specific embodiment of my invention, such is to be considered as illustrative, only and not restrictive, since the scope of the invention is defined in the terms of the subjoined claims.

What I claim and desire to secure by U. S. Letters Patent is:

1. A gauge comprising a casing; pressure-responsive means and indicating means removably mounted as a unit within said casing; said pressure-responsive means comprising a light flexible diaphragm clamped between a pair of spaced plates; one of said plates defining a stop for said diaphragm and the other of said plates defining with said diaphragm a pressure chamber, said plates being mounted within a shallow casing and being held against separational movement by bending over the edges of said shallow casing into contact with one of said plates.

2. A gauge comprising a casing; pressure-responsive means and indicating means removably mounted as a unit within said casing; said pressure responsive means comprising a light flexible diaphragm clamped between a pair of spaced plates; one of said plates defining a stop for said diaphragm and the other of said plates defining with said diaphragm a pressure chamber, said indicating means comprising bendable rocking means designed to engage said diaphragm, a spring for pressing said rocking means into engagement with said diaphragm, a movable indicator mounted for rotation at right angles to the movement of said rocking means, and a connection between said indicator and said rocking means.

3. A diaphragm gauge comprising a casing; and a sensitive indicating device removably supported in said casing; said device comprising a unitary diaphragm assembly and diaphragm movement indicating means supported by said diaphragm assembly; said diaphragm assembly comprising a mounting plate provided with an extension projecting through said casing and adapted for securing said device within said casing and for the attachment thereto of a conduit; a diaphragm stop plate; a light flexible diaphragm supported between said mounting plate and said diaphragm stop plate; said mounting plate and said diaphragm defining a pressure chamber in communication with a port in said extension; and a third plate, designed to support said indicating means and to position said stop plate relative to said mounting plate.

4. The combination defined in claim 3 in which said diaphragm movement indicating means comprises a rocker arm yieldably maintained in engagement with said diaphragm; a link pivotally connected at one end thereof to said rocker arm; a light spring biasing said arm toward said diaphragm; a pivoted indicating pointer and a crank arm mounted to swing therewith; the opposite end of said link being pivotally connected to said crank arm.

5. In a low pressure gauge of the diaphragm type, a thin sheet of flexible, non-metallic material; means adjacent one surface of said sheet designed to form therewith a fluid chamber; a pair of packing rings fitted against the marginal area of the respective surfaces of said sheet, whereby a portion of said sheet surrounded by said rings forms a diaphragm movable in response to fluid pressure fluctuation; a stop plate disposed adjacent the other surface of said sheet to prevent undue flexing and rupture of the latter; means for forcing said plate towards said first mentioned means to cause said packing rings to firmly and uniformly hold the margin of said sheet in operative position, said last mentioned means comprising an element receiving the assembly of said plate, rings and chamber-forming means and provided with a flange having its free edge bent against said assembly; and indicating mechanism mounted on said element for actuation in response to movement of said diaphragm.

6. In a diaphragm gauge for measuring fluid pressures, a diaphragm and means cooperating therewith to form a fluid chamber; an actuator carried by said diaphragm for movement therewith; a narrow U-shaped rocker having the free end of one leg thereof pivoted closely adjacent said actuator and the free end of its other leg in free engagement with said actuator to be actuated thereby; pressure indicating means; and mechanism interconnecting said rocker and said means.

7. In a diaphragm gauge for measuring fluid pressures, a diaphragm and means cooperating therewith to form a fluid chamber; an actuator carried by said diaphragm for movement therewith; U-shaped rocker having the end of one leg thereof pivoted adjacent said actuator and the end of its other leg in free engagement with said actuator to be actuated thereby; pressure indicating means comprising a pivoted pointer, and mechanism interconnecting said rocker and said means, said mechanism comprising a crank mounted to swing with said pointer, and a link pivoted at one end to the body of said U-shaped rocker and at its other end to said crank.

PAUL GAISER.